United States Patent [19]
Goodacre et al.

[11] Patent Number: 5,822,416
[45] Date of Patent: Oct. 13, 1998

[54] SYSTEM AND METHOD FOR REAL-TIME SCREENING AND ROUTING OF TELEPHONE CALLS

[75] Inventors: Anthony John Goodacre, Issaquah, Wash.; John Hoyt Prisock, Alpharetta, Ga.

[73] Assignee: Mosaix, Inc., Redmond, Wash.

[21] Appl. No.: 606,490

[22] Filed: Mar. 4, 1996

[51] Int. Cl.⁶ .............................. H04M 1/56; H04M 1/64
[52] U.S. Cl. .............................. 379/142; 379/67; 379/95; 379/89; 379/214; 379/198; 379/127; 379/157
[58] Field of Search ................................. 379/142, 156, 379/157, 188, 198, 199, 93.02, 93.03, 93.23, 231, 233, 67, 210, 212, 214, 76, 93.17, 354, 127, 118, 120, 164, 165, 171, 211

[56] References Cited

U.S. PATENT DOCUMENTS

| | | | |
|---|---|---|---|
| 4,277,649 | 7/1981 | Sheinbein | 379/201 |
| 4,313,035 | 1/1982 | Jordan et al. | 379/211 |
| 4,625,081 | 11/1986 | Lotito et al. | 379/196 |
| 4,672,660 | 6/1987 | Curtin | 379/142 |
| 4,757,267 | 7/1988 | Riskin | 379/201 |
| 4,924,496 | 5/1990 | Figa et al. | 379/142 |
| 5,029,196 | 7/1991 | Morganstein | 379/67 |
| 5,109,405 | 4/1992 | Morganstein | 379/89 |
| 5,309,504 | 5/1994 | Morganstein | 379/67 |
| 5,425,089 | 6/1995 | Chan et al. | 379/183 |
| 5,625,676 | 4/1997 | Greco et al. | 379/67 |

*Primary Examiner*—Paul Loomis
*Assistant Examiner*—Rexford Barnie
*Attorney, Agent, or Firm*—Seed and Berry LLP

[57] ABSTRACT

The disclosed invention provides system and method for real-time screening and routing of incoming telephone calls. The invention provides a method of automatically routing incoming telephone calls to either internal phone call processing resources or to destination parties (system users) as defined by the individual destination parties. Dynamic extensions are assigned by a system user on demand from a pool of unassigned extensions, which are generated by an autoattendant telephone call routing system. As a dynamic extension is assigned to a particular caller, identification attributes are input into the system, which may include calling party identification information supplied by the source carrier of the calling party. The system then tags the assigned extension with the identifying information. Such tags are subsequently used by the system to classify the caller when the caller accesses internal call processing resources. The tags may also be provided to the destination party via an asynchronous notification means on the destination party's associated computer terminal or networked personal computer (PC). This allows the destination party to identify a caller and instruct the telephone routing system to further control the routing of a telephone call in real time.

49 Claims, 2 Drawing Sheets

SYSTEM AND METHOD FOR REAL-TIME SCREENING AND ROUTING OF TELEPHONE CALLS

FIELD OF THE INVENTION

This invention relates generally to a system and method for automatically routing incoming telephone calls. More specifically, this invention relates to a new system and method which can route incoming telephone calls to either internal telephone call processing resources as defined by a destination party.

BACKGROUND OF THE INVENTION

While most individuals in our society would be unable to function without the ability to communicate with remote individuals using the telephone, there are times when incoming telephone calls are an unwelcome annoyance. However, even when an individual does not want to be interrupted by annoyance telephone calls, such an individual would still welcome incoming calls of an emergency nature or those providing important information. In these cases, the telephone must be answered. In the past, many businesses have utilized receptionists and/or secretaries to screen incoming telephone calls. However, with the ever increased cost of personnel services, companies are viewing such human interaction as a luxury that is difficult to justify. As such, many businesses have incorporated automated telephone attendant systems ("autoattendants") into their business telephony systems. However, many of these systems lack the flexibility to screen incoming telephone calls and either direct all calls to a system user's fixed physical telephone extension or to a electronic answering or "voice-mail system."

The shortcomings of these inflexible systems, has led to a significant amount of innovation in the telephony arts. In fact, many telephony systems have been developed that allow a user to screen incoming telephone calls by assigning various access codes or the like to specific individuals. An example of such a system is U.S. Pat. No. 4,845,743. In this system, an automated answering device answers all incoming telephone calls. The system then allows a caller to input a series of tone frequencies which are decoded by a dual tone multifrequency (DTMF) receiver, after which a comparison is made between the code input by a caller and a code input by the system user. If a match exists, then the system forwards the call to the system user.

Other, and somewhat more sophisticated systems, are disclosed in U.S. Pat. Nos. 3,604,854; 4,266,098; 4,817,133; 4,893,335 and others. However, while these systems all require an input from a caller in order to provide the necessary identification information, they do not provide the flexibility and inherent advantages of the disclosed invention, which includes real time interaction by a system user in order to instruct the call routing system.

Additional prior art systems incorporate devices and methods that accept information provided by the telephone signal of an incoming telephone call. Examples of these types of systems are found in U.S. Pat. Nos. 4,277,649 and 4,924,496. However, these systems can only recognize a station (phone) from which a phone call originates. In many business or private situations, these "caller-ID" systems provide no benefit in identifying callers since multiple individuals may share the same station, such as a large company having a limited amount of physical phone lines accessing hundreds of employees through a private branch exchange (PBX) telephone network. Even in home scenarios, multiple persons use a single telephone line. Thus, positive caller identification cannot be guaranteed.

Accordingly, a new and improved system and method for caller identification and subsequent call routing is needed.

OBJECTS OF THE INVENTION

It is therefore an object of the present invention to provide a new system and method for real-time screening and routing of incoming telephone calls, which allows destination parties to assign multiple extension numbers in addition to their fixed PBX extension to direct calls to themselves.

Another object of the invention is to provide a system and method for real-time screening and routing of incoming telephone calls where tags assigned to the numbers can be used to identify a caller prior to the call being placed to the destination party's fixed PBX extension.

Yet another object of the invention is to provide a system and method for real-time screening and routing of incoming telephone calls, which gives a destination party the flexibility to reroute an incoming call to other telephony resources, such as a voice messaging system, without indicating to the caller that such intervention has occurred.

Still another object of the invention is to provide a system and method for real-time screening and routing of incoming telephone calls, which offers personalized greeting recordings if the system automatically, or through destination party intervention, routes an incoming call into an on-hold state prior to allowing the incoming call to be connected to the destination party's fixed PBX extension.

A further object of the invention is to provide a system and method for real-time screening and routing of incoming telephone calls that allow a destination party to define routes though the telephone system by means of a dynamically assigned extension number to direct incoming callers to any one of a number of available telephony resources.

An even further object of the invention is to provide a system and method for real-time screening and routing of incoming telephone calls that allows the destination party to define extension numbers whose validity is defined for a fixed period of time.

Still another object of the invention is to provide a system and method for real-time screening and routing of incoming telephone calls that allows a destination party to configure and maintain his or her set of dynamically assigned extensions by means of a call routing command module, comprising a graphical interfaced computer application that communicates with and sends routing commands to a telephone call routing logic subsystem.

Yet another object of the invention is to provide a system and method for real-time screening and routing of incoming telephone calls, which can instruct the telephone call routing system when connecting an incoming caller and a destination party to maintain a switching system conference and, under destination party control, record, play-back and deliver to the destination party's voice mailbox all or part of a conversation.

An additional object of the invention is to provide a system and method for real-time screening and routing of incoming telephone calls that can be instructed, via a user-configured "pop-up" dialog box, to automatically instruct the routing system to direct all calls to a telephone messaging system.

A further object of the invention is to provide a system and method for real-time screening and routing of incoming telephone calls that can attach the called party tag information to any voice messages that the caller leaves allowing selection methods to be used to subsequently access voice messages.

These and still other objects of the present invention will become apparent to those skilled in the art from the following description.

SUMMARY OF THE INVENTION

A new system and method for real-time screening and routing of incoming telephone calls is disclosed, which provides a method of automatically routing incoming telephone calls to either internal phone call processing resources or to destination parties (system users) as defined by the individual destination parties. Dynamic extensions are assigned by a system user on demand from a pool of unassigned extensions, which are generated by an autoattendant telephone call routing system. As a dynamic extension is assigned to a particular caller, identification attributes are input into the system. The identification attributes may include a particular caller's name, address, telephone number or other personal information. They may also include calling party identification ("caller-ID") information supplied by the source carrier of the calling party. The system then tags the assigned extension with the identifying information. Such tags are subsequently used by the system to classify the caller when the caller accesses internal call processing resources. The tags may also be provided to the destination party via an asynchronous notification dialog box on the destination party's associated computer terminal or networked personal computer (PC). This allows the destination party to identify an incoming caller and instruct the telephone routing system to further control the routing of a telephone call in real time.

DETAILED DESCRIPTION OF THE INVENTION

The disclosed system and method can be used as both a means of caller identification independent of any available identification and as a method of routing incoming telephone calls, which have been identified, to specific telephony services or fixed, physical destination party PBX extensions. All of the foregoing is accomplished under the dynamic control of the users of the system. It is an adjunct to a classical voice mail—automated attendant ("autoattendant") system.

Figure 1:
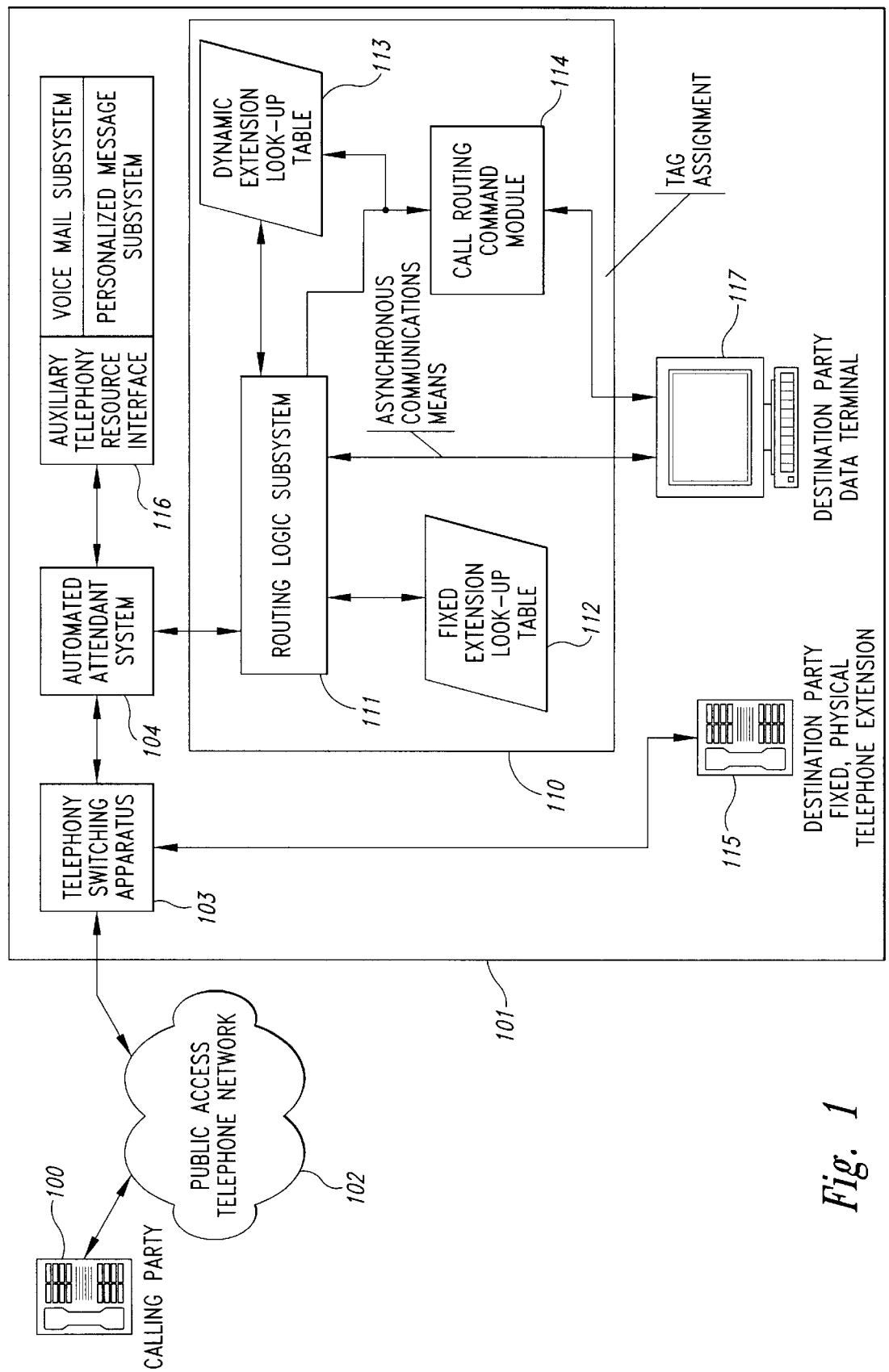
FIG. 1 shows a block diagram of the system for real-time screening and routing of incoming telephone calls.
Figure 2:
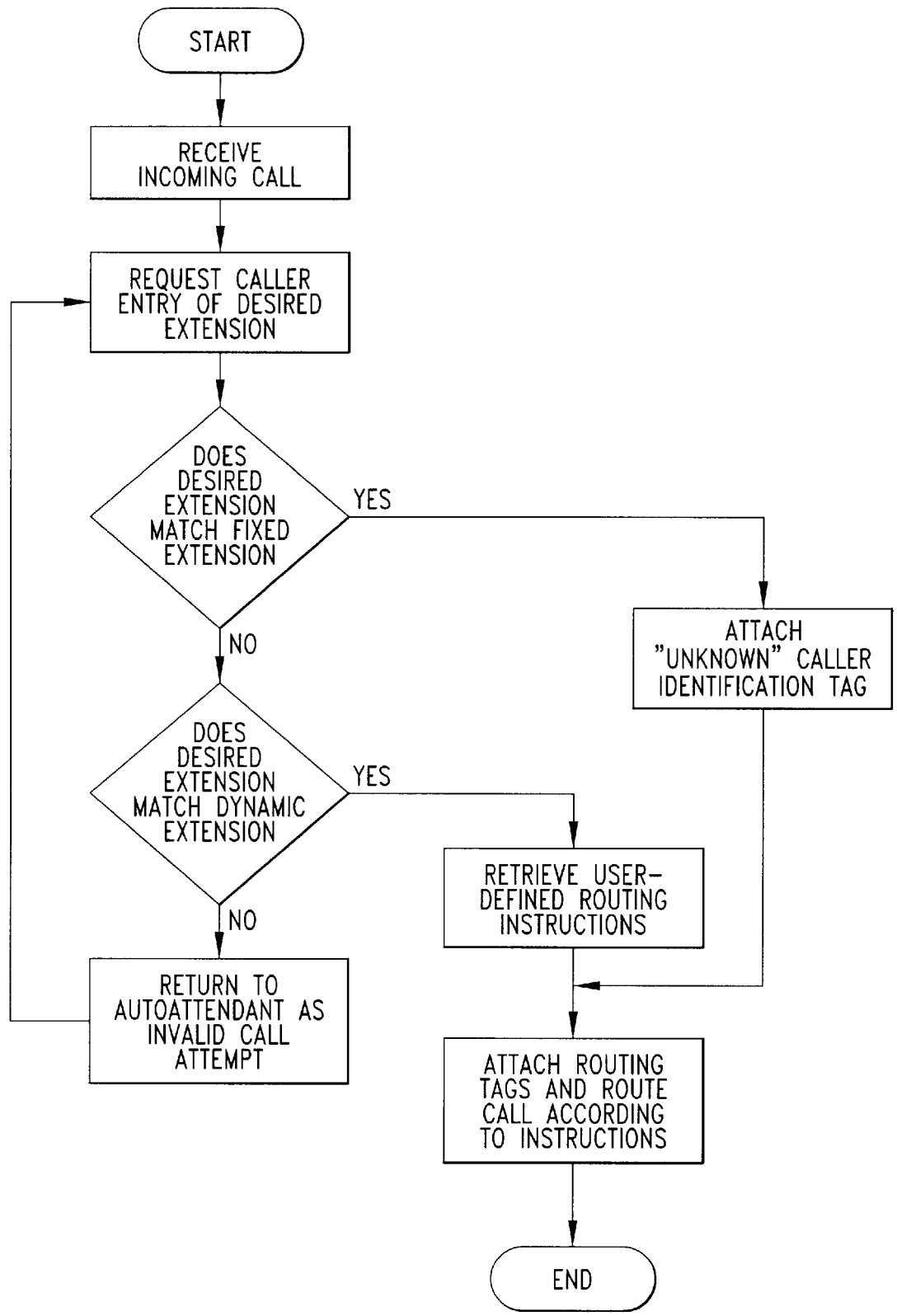
FIG. 2 is a flowchart showing the steps perfomed by the disclosed system for real-time screening and routing of incoming telephone calls when an incoming telephone call is received.

Turning now to FIG. 1, the major components of the overall system are shown in a block diagram format. A calling party 100 initiates a telephone call to a desired destination party, which is routed to the call screening and routing system 101 via a public access telephone network 102. The system 101 comprises a telephony switching apparatus 103, which directs all incoming telephone calls to a conventional autoattendant 104. Once an incoming call is "answered" by the autoattendant 104, the autoattendant directs the incoming caller to enter the desired extension number of the party the calling party wishes to reach. This extension number and the control of the call is then transferred by the autoattendant 104 to a dynamic extension system 110. Furthermore, the autoattendant 104 screens the incoming call to determine if the call contains any identifying information, such as carrier calling party identification, which is conventional data provided by many telecommunication providers to identify the telephone number of a station from which a call is initiated. If any such information is present, then the autoattendant 104 attaches this information to the incoming call as a caller identification tag prior to routing the incoming call to the dynamic extension system 110. Caller identification tags indicate identifying data which can be used to uniquely identify an incoming caller. In addition to caller-ID information, examples of caller identification tags include a caller's name, address, telephone number, date of birth or any other unique identifying information.

The dynamic extension system 110 comprises a routing logic subsystem 111, a locally-coded fixed extension look-up table, 112, a user-maintained dynamic extension look-up table 113 and a destination party call routing command module 114, which is accessed via a destination party's computer terminal or PC 117. The fixed extension look-up table contains a listing of the fixed, physical extension numbers assigned to the telephone handsets (or headsets as the case may be) used by the various destination parties in a particular PBX phone system. Fixed, physical extension numbers are a function of the PBX phone system and comprise the hardwired link between an incoming call and a specific destination party. The dynamic extension look-up table contains a listing of dynamically-assigned "virtual" extension numbers. For example, a destination party may assign a dynamic extension to a specific supplier, customer, salesperson, etc. In this way, any of these people place an incoming call to the same destination party, each will enter a different, pre-assigned dynamic extension number. While they will all seek to call the same destination party, the use of different dynamic extension numbers will allow the system to identify the different incoming callers.

The dynamic extension look-up table will change from time to time as dynamic extensions are assigned, terminated or expire. A dynamic extension may be permanently assigned to a specific calling party, such as a destination party's spouse or may be assigned for a limited period of time. An example of a limited-time dynamic extension would be when a destination party leaves a message to have a specific calling party return his or her call that day. The destination party could then pre-set the dynamic extension to expire at midnight. A destination party may also program a specific dynamic extension to expire upon the receipt of an incoming call to the specified dynamic extension. In this way, the dynamic extension system 110 will not contain numerous dynamic extensions that are no longer needed.

When a calling party enters a desired extension number, as directed by the autoattendant 104, the dynamic extension system 110 compares the desired extension number with a list of fixed extension numbers that are resident in the locally-coded fixed extension look-up table 112 to determine whether the calling party has indicated a desire to be directed to a particular destination party's physical PBX telephone extension. If the desired extension number entered by the incoming caller matches a physical extension number in the fixed extension look-up table 112, then the telephone call may be tagged with attributes that describe the calling party as "unknown." Once an incoming call is tagged as "unknown", the system routes the call to the desired destination party's call routing command module 114 and routes the call in accordance with instructions provided by the destination party for "unknown" calls. For example, all "unknown" calls may be routed directly to a voice messaging system.

On the other hand, if a comparison of the desired extension with the fixed extension look-up table 112 does not result in a match, then the dynamic extension system 110 accesses the user-maintained dynamic extension look-up table 113 to determine if the desired extension number matches a dynamically created extension number in the dynamic extension look-up table 113. If such a match is found, then the system 101 attaches the identification and routing action tags assigned to the extension number by the specific system user to the incoming call and routes the incoming call in accordance with the user defined routing action tags. As indicated earlier, identification tags provide information to identify a specific incoming caller. Routing action tags, on the other hand, instruct the system 101 how to handle a specific incoming call. For example, routing action tags may instruct to system to route an incoming call to a voice messaging system. They may also instruct the system 101 to route an incoming call to a fixed physical PBX extension, route a call to a conferencing system or route the call to any other auxiliary telephony resource through the auxiliary telephony resource interface 116. If no match exists in the dynamic extension table 113, then the dynamic extension system 110 returns the calling party to the autoattendant 104 as an invalid call attempt. The autoattendant 104 would then advise the incoming caller that the desired extension number is not valid and would instruct the incoming caller to enter an additional desired extension number. The system 101 would then repeat the call identification and routing process.

The dynamic extension system 110 may attach any one of a number of routing action tags to an incoming call. In the preferred embodiment of the invention, the routing action tags allow an incoming call to be directed to a destination party's fixed physical PBX telephone extension 115 or to any number of other auxiliary telephony resources, such as a voice messaging or "voice mail" system, via auxiliary telephony resource interface 116.

If the routing action tag indicates that an incoming call is to be directed to a destination party, then the dynamic extension system 110 sends an incoming call signal to the destination party's computer terminal or PC 117 by means of an asychronous communications means or network connection to the call routing command module 114, running on the destination party's associated computer terminal or PC 117.

On the other hand, the routing action tags can specify, by way of example, that the call routing command module return the incoming call to the routing logic subsystem 111 with instructions to place the incoming call into the voice messaging system via the auxiliary telephony resource interface 116 without any destination party notification or interaction. Otherwise, the telephony application will generate and display a call indication message in an information dialog box on the destination party's call routing command module at his or her local computer terminal or PC. The information dialog box will inform the destination party that an incoming call is present and will display the assigned caller identification tags as a key component of the call indication message. An audio signal may also be triggered by the display of the information dialog box in order to advise a destination party that an incoming call is present in the event that the destination party is not looking at the computer screen when the dialog box is first displayed.

The destination party can route an incoming call in a number of ways once apprised that an incoming call is being presented for consideration. These user-directed options are selected by entering one of a number user-defined commands into the call routing command module 114 via the user's input device, such as a keyboard, mouse or the like. For example, the destination party may command the system 101 to send the incoming call into the voice mail system. The destination party may also place a caller on hold, in which case the caller may be addressed by a pre-recorded message that the destination party has created for the purpose of individualizing an information message to the caller. For example, an individualized message could state, "Hi John, I'm currently on another call. However, I really need to speak with you. I will be right with you so, please hold on."

If the destination party takes no action, then the telephony application will default to a user-defined default action. This default action may either direct the system 101 to put the incoming call into the voice mail system or transfer the caller to the destination party's fixed extension 115. The destination party can take an incoming call off "hold" by either routing the caller to the voice mail system or by directing the system to connect the incoming call to the destination party's fixed extension 115. Additional incoming calls are processed by the system 101 in a like manner, thus allowing the destination party to make decisions as to which incoming calls to handle first.

Whenever the call routing command module is configured by a destination party to connect an incoming call to his or her fixed extension 115, the application will check the user-defined options to determine whether or not the destination party has instructed the system 101 to maintain an active audio path to the connection for conferencing or the like. The active audio path will allow a specific conversation to be recorded by a destination party in its entirety. This is accomplished using the recording capabilities of the voice messaging system via the auxiliary telephony resource interface 116. The conferencing function also allows for conference calls between a plurality of incoming callers and destination parties in conduction with the features of the fixed PBX telephone system. If conferencing is not desired, then the system 101 has completed its control of the incoming call at the time it is connected to a destination party's fixed extension 115.

On the other hand, if the system 101 is in a conference mode, then an additional dialog box will be presented to the destination party on the destination party's computer terminal or PC 117. In addition to allowing a destination party to record a call in its entirety, this conferencing dialog will allow the destination party to playback a particular message or conversation. At any point, a destination party may choose to send a recording into the voice messaging system, at which time the routing system 111 completes its control of an incoming call.

If at any time a routing action tag instructs the system 101 to transfer an incoming call to another telephony resource, then the system 101 will pass any attached identification tags and the control of the incoming call to the transferee's local call routing command module.

Various additional changes coming within the spirit of the invention may suggest themselves to those skilled in the art; hence the invention is not limited to the specific embodiment shown or described, but the same is intended to be merely exemplary. It should be understood that numerous other modifications and embodiments can be devised by those skilled in the art that will fall within the spirit and scope of the principles of the invention.

What is claimed is:

1. A system for real-time screening and routing of incoming telephone calls, comprising a telephony switching apparatus, an autoattendent system, an auxiliary telephony resource interface, at least one destination party fixed, physical telephone extension and a dynamic extension system, said dynamic extension system comprising a call routing logic subsystem and at least one destination party call routing command module, said telephone switching apparatus configured to direct all incoming telephone calls to said autoattendant, said autoattendant answering each of said incoming calls, determining a destination telephone number entered by a calling party and routing said destination telephone number to said call routing logic subsystem, said routing logic subsystem being user-configurable to provide calling party-specific routing instructions to said autoattendant to route said answered calls in accordance with the user configuration associated with said destination telephone number without notifying an incoming caller of any destination party interaction wherein said call routing logic subsystem is responsive to said destination telephone number entered by said calling party comrpising a pre-assigned dynamic extension number, which is assigned to a specific calling party by a destination party on demand from a central pool of assignable dynamic extension numbers.

2. The system for real-time screening and routing of incoming telephone calls of claim 1 wherein said call routing logic subsystem is responsive to a plurality of assigned dynamic extension numbers assigned by said destination party to different calling parties.

3. The system for real-time screening and routing of incoming telephone calls of claim 2 wherein said call routing logic subsystem responds to said dynamic extensions for predetermined periods of time.

4. The system for real-time screening and routing of incoming telephone calls of claim 1 wherein said call routing command module comprises an input device operable by a destination party to assign identifying information to said pre-assigned dynamic extension contemporaneously with said assignment to identify said specific calling party.

5. The system for real-time screening and routing of incoming telephone calls of claim 4 wherein said call routing command module further comprises a communication link coupled to a destination party's local computer terminal to notify said destination party that said specific calling, party has placed an incoming telephone call to said destination party.

6. The system for real-time screening, and routing of incoming telephone calls of claim 5 wherein said communication link comprises a visual display of said identifying information which has been pre-assigned to said specific calling party by said destination party, thus allowing said destination party to positively identify said calling party prior to answering said incoming telephone call.

7. The system for real-time screening and routing of incoming telephone calls of claim 5 wherein said call routing command module operates to provide real-time control of said incoming telephone call by said destination party by selecting one of a plurality of destination party-defined routing options.

8. The system for real-time screening and routing of incoming telephone calls of claim 7 wherein said destination party-defined routing options includes said call routing logic subsystem routing said incoming call to a voice messaging system and routing said incoming call to said destination party's physical telephone extension so that said destination party may personally answer said incoming call.

9. The system for real-time screening and routing of incoming telephone calls of claim 5 wherein said destination party call routing command module further comprises a destination party-controllable recording system to record, and play back conversations and to deliver unique voice messages tagged to specific dynamic extensions.

10. The system for real-time screening and routing of incoming telephone calls of claim 9 wherein said recording system is destination party-configurable to record a conversation and store said recording in a voice mail system.

11. The system for real-time screening and routing of incoming telephone calls of claim 9 wherein said unique voice messages comprise individualized greetings, which are tagged to specified dynamic extensions and played by said recording system.

12. The system for real-time screening and routing of incoming telephone calls of claim 9 wherein said recording system permits unique voice messages comprising customized messages, pre-recorded by said destination party and tagged to a specific calling party so that said recording system can deliver important information to said calling party without the need for said destination party to speak directly to said calling party.

13. A method for real time screening and routing of incoming telephone calls comprising the steps of:

associating a unique dynamic extension number with a specific incoming caller prior to the initiation of an incoming call;

responding to an extension number entered by said incoming caller;

comparing said caller-entered extension number with a fixed extension look-up table to determine whether said caller-entered extension number matches a fixed, physical extension number in said fixed extension look-up table;

tagging said incoming call with attributes that describe the calling party as unknown if said caller-entered extension number is in said fixed extension look-up table;

if said caller-entered extension number is not in said fixed extension look-up table, comparing said caller-entered extension number to a user maintained dynamic extension look-up table to determine if said caller-entered extension number matches said associated dynamic extension number;

tagging said incoming call with identification and routing action tags pre-assigned to said associated dynamic extension number by a system user if said caller-entered extension number matches said associated dynamic extension number; and routing said incoming call in accordance with said routing action tags.

14. The method for real-time screening and routing of incoming telephone calls of claim 13, further comprising the step of notifying a destination party that a specific calling party has placed an incoming telephone call to said destination party by displaying said identifying information.

15. The a method for real-time screening and routing of incoming telephone calls of claim 14, further comprising the step of sensing said destination party selection of one of a plurality of user-directed options upon being notified of said incoming call.

16. The method for real-time screening and routing of incoming telephone calls of claim 15, wherein said plurality of user-directed options comprise directing said incoming call to said destination party's fixed physical extension so that said destination party may answer said incoming call and speak directly to a calling party, placing said incoming call on hold, or activating a conference system, which may provide an individualized greeting and deliver an individualized message or information to said calling party.

17. A system for processing incoming telephone calls, the system comprising:
 a telephone switching apparatus configured to receive and route the incoming telephone calls;
 a physical telephone device coupled to said switching apparatus and operable by a user of the system to receive the incoming telephone call, said telephone device being associated with a fixed telephone extension number wherein said telephone switching apparatus routes the incoming telephone call to said telephone device if the incoming call is directed to said fixed telephone extension number;
 an auxiliary telephone interface coupled to said switching apparatus and operable by a user of the system to receive the incoming telephone call; and
 a data structure to store a dynamic telephone extension number provided by the user of the system to a potential caller and user-selected routing instructions associated with said dynamic telephone extension number, said telephone switching apparatus routing the incoming telephone call in accordance with said user-selected routing instructions associated with said dynamic extension number if said incoming call is directed to said dynamic extension number.

18. The system of claim 17 wherein said telephone switching apparatus routes the incoming call to said telephone device if said user-selected routing instructions associated with said dynamic extension number include instructions to route the incoming call to said telephone device.

19. The system of claim 17, further including a message notification system to notify the user that the incoming call has been received and a user input device to select among a plurality of call routing options in real-time when said message notification system notifies the user that the incoming call has been received, said user input device operable by the user to select one of said plurality of options comprising routing the incoming call to said telephone device, routing the incoming call to said auxiliary telephone interface, placing the incoming call on hold, and activating a recording system to provide an individualized message to the caller.

20. The system of claim 19 wherein said individualized message is a greeting for the caller.

21. The system of claim 17 wherein said telephone switching apparatus routes the incoming call to said auxiliary telephone interface if said user-selected routing instructions associated with said dynamic extension number used by the caller include instructions to route the incoming call to said auxiliary telephone interface.

22. The system of claim 17 wherein said telephone switching apparatus responds temporarily to said dynamic extension number used by the caller.

23. The system of claim 20 wherein said telephone switching apparatus responds to said dynamic extension number used by the caller for a predetermined period of time.

24. The system of claim 20 wherein said telephone switching apparatus responds to said dynamic extension number used by the caller for a predetermined number of incoming calls by the caller.

25. A system for processing an incoming telephone call using a telephone switching apparatus, the switching apparatus being coupled to a physical telephone operable by a user of the system to receive the incoming telephone call and associated with a fixed telephone extension number, the system comprising:
 a call routing processor coupled to the switching apparatus to provide routing instructions to the switching apparatus, said call routing processor instructing the telephone switching apparatus to route the incoming telephone call to the telephone device if the incoming call is directed to the fixed telephone extension number associated with the telephone device;
 an auxiliary telephone interface coupled to the switching apparatus and operable by a user of the system to receive the incoming telephone call; and
 a data structure to store a dynamic telephone extension number provided by the user of the system to a potential caller and to store user-selected routing instructions associated with said dynamic telephone extension number, said call routing processor instructing the telephone switching apparatus to route the incoming telephone call in accordance with said user-selected routing instructions associated with said dynamic extension number if the incoming call is directed to said dynamic extension number.

26. The system of claim 25 for use with a computer used by the user of the system and coupled to said call routing processor wherein said data structure further includes caller identifying information entered by the user of the system and associated with said dynamic extension telephone number, said call routing processor further providing said caller identifying information associated with said dynamic extension number to the computer if the incoming call is directed to said dynamic extension number to thereby provide notification to the user that an incoming call directed to said dynamic extension number has been received.

27. The system of claim 25, further including a recording system coupled to said auxiliary telephone interface and operable by the user to pre-record a unique message associated with said dynamic telephone extension number, said recording system automatically playing back said pre-recorded message to the caller if the incoming call is directed to said dynamic extension number to thereby automatically provide a unique message for the caller.

28. The system of claim 27 wherein said recording system is configurable by the user to record a conversation and store said recording in a voice mail system.

29. The system of claim 28 wherein said unique message is an individualized greeting for the caller.

30. The system of claim 25 wherein said call routing processor instructs the telephone switching apparatus to route the incoming telephone call to the telephone device if said user-selected routing instructions include instructions to route the incoming call to the telephone device.

31. The system of claim 25 wherein said call routing processor responds temporarily to said dynamic extension number used by the caller.

32. The system of claim 31 wherein said call routing processor responds to said dynamic extension number used by the caller for a predetermined period of time.

33. The system of claim 31 wherein said call routing processor responds to said dynamic extension number used by the caller for a predetermined number of incoming calls by the caller.

34. The system of claim 25, further including a message notification system to notify the user that the incoming call has been received and a user input device to select among a plurality of call routing options in real-time when said message notification system notifies the user that the incoming call has been received, said user input device operable by the user to select one of said plurality of options comprising routing the incoming call to the telephone device, routing the incoming call to said auxiliary telephone interface, placing the incoming call on hold, and activating a recording system to provide an individualized message to the caller.

35. The system of claim 34 wherein said individualized message is an individualized greeting for the caller.

36. A method for processing an incoming telephone call using a telephone switching apparatus, the switching apparatus being coupled to a physical telephone operable by a user of the system to receive the incoming telephone call and associated with a fixed telephone extension number, the method comprising the steps of:

detecting an extension number associated with the incoming call;

instructing the telephone switching apparatus to route the incoming telephone call to the telephone device if the incoming call is directed to the fixed telephone extension number associated with the telephone device;

storing a dynamic telephone extension number provided by the user of the system to a potential caller;

storing user-selected routing instructions associated with said dynamic telephone extension number; and instructing the telephone switching apparatus to route the incoming telephone call in accordance with said user-selected routing instructions associated with said dynamic extension number if the incoming call is directed to said dynamic extension number.

37. The method of claim 36 for use with a computer used by the user, the method further including the steps of:

detecting user entry of caller identifying information;

storing said user-entered caller identifying information in association with said dynamic extension telephone number; and providing said caller identifying information associated with said dynamic extension number to the computer if the incoming call is directed to said dynamic extension number to thereby provide notification to the user that an incoming call directed to said dynamic extension number has been received.

38. The method of claim 36, further including the steps of pre-recording a unique message;

associating said pre-recorded message with said dynamic telephone extension number;

storing said pre-recorded message in association with said dynamic telephone extension number; and automatically playing back said pre-recorded message to the caller if the incoming call is directed to said dynamic extension number to thereby automatically provide a unique message for the caller.

39. The method of claim 38 wherein said pre-recorded message is an individualized greeting for the caller.

40. The method of claim 38, further including the step of recording a conversation with the caller and storing said recording in a voice mail system.

41. The method of claim 36 wherein said step of instructing in accordance with said user-selected routing instructions provides instructions to the telephone switching apparatus to route the incoming telephone call to the telephone device if said user-selected routing instructions include instructions to route the incoming call to the telephone device.

42. The method of claim 36 wherein said step of instructing in accordance with said user-selected routing instructions provides instructions to the telephone switching apparatus to route the incoming telephone call to an auxiliary telephone interface coupled to the switching apparatus if said user-selected routing instructions include instructions to route the incoming call to said auxiliary telephone interface.

43. The method of claim 36, further including the steps of:

notifying the user that the incoming call has been received;

sensing user input to select among a plurality of call routing options in real-time when the user has been notified that the incoming call has been received, said plurality of options comprising routing the incoming call to the telephone device, routing the incoming call to said auxiliary telephone interface, placing the incoming call on hold, and activating a recording system to provide an individualized message to the caller; and processing the incoming call in accordance with said user-selected routing option.

44. The method of claim 43 wherein said individualized message is an individualized greeting for the caller.

45. The method of claim 36 wherein said step of instructing in accordance with said user-selected routing instructions responds temporarily to said dynamic extension number used by the caller.

46. The method of claim 45 wherein said step of instructing in accordance with said user-selected routing instructions responds to said dynamic extension number used by the caller for a predetermined period of time.

47. The method of claim 45 wherein said step of instructing in accordance with said user-selected routing instructions responds to said dynamic extension number used by the caller for a predetermined number of incoming calls by the caller.

48. A system for real-time screening and routing of incoming telephone calls, the system comprising:

a telephony switching apparatus to receive and route the incoming telephone calls based on extension numbers entered by callers;

at least one destination party fixed, physical telephone extension, the telephony switching apparatus routing the incoming calls to the fixed extension if the caller-entered extension number corresponds to the fixed telephone extension;

a pool of reusable dynamic extension numbers, selected ones of the dynamic extension numbers being provided to a user and selectively provided to callers by the user in advance of the switching apparatus receiving the incoming telephone calls from the callers; and a user-configurable call routing logic subsystem to provide calling party-specific routing instructions to the switching apparatus to route the incoming calls in accordance with the user configuration associated with the selected dynamic extension numbers.

49. The system of claim 48 wherein the call routing logic subsystem permits the release of a portion of the selected dynamic extension numbers to be returned to the central pool for reuse when no longer needed by the user.

* * * * *